No. 759,369. Patented May 10, 1904.

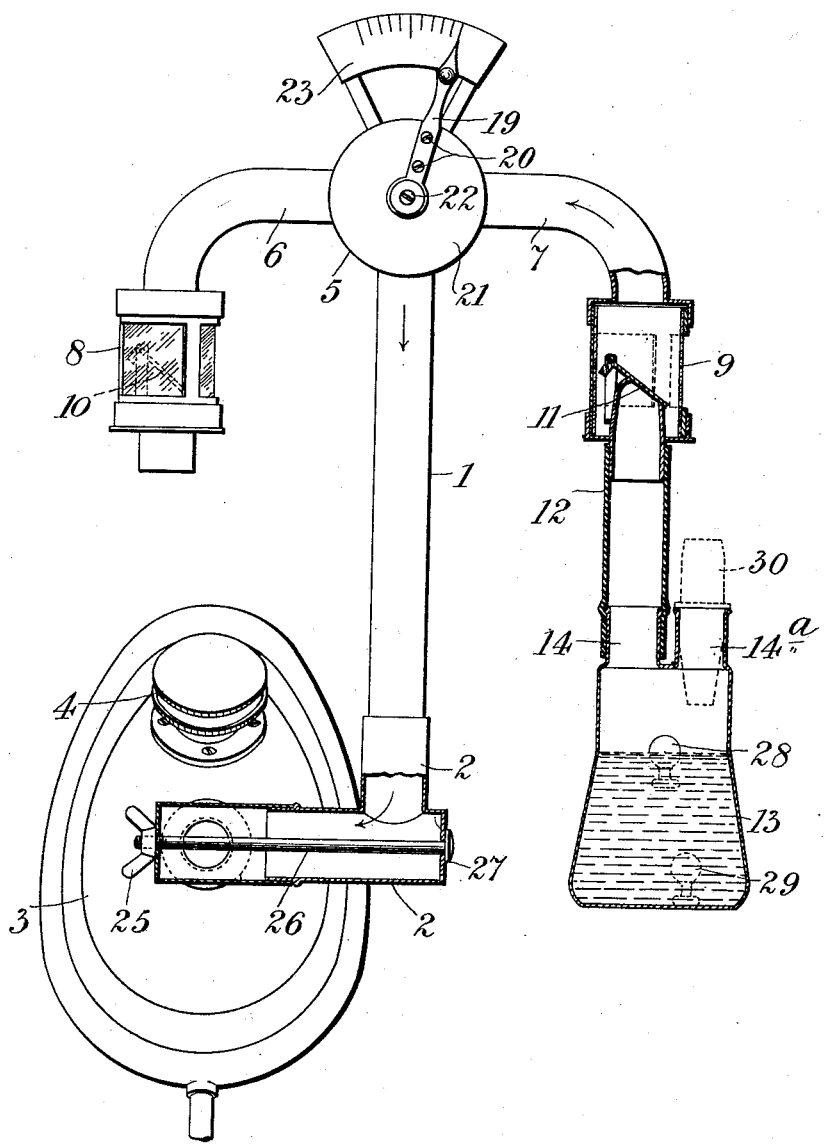

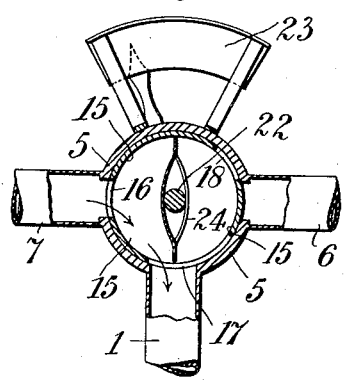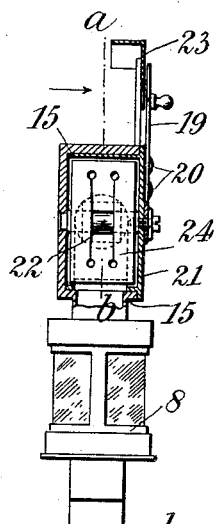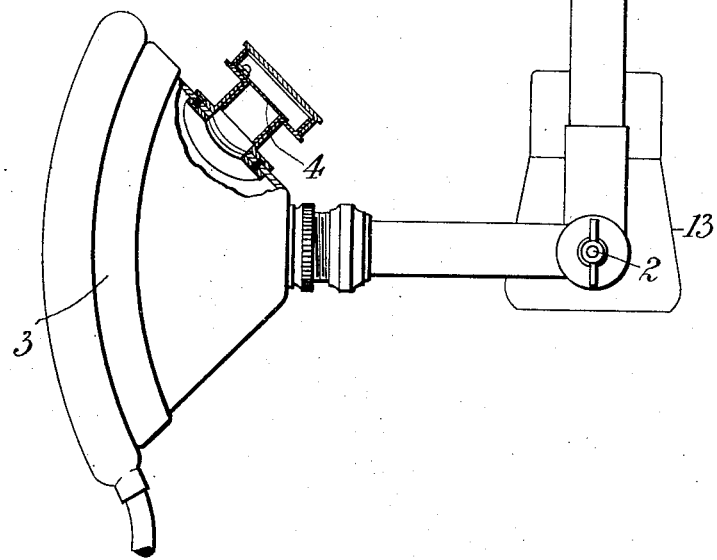

UNITED STATES PATENT OFFICE.

AUGUSTUS GEORGE VERNON HARCOURT, OF RYDE, ISLE OF WIGHT, ENGLAND, ASSIGNOR TO JOHN J. GRIFFIN & SONS, LIMITED, OF LONDON, ENGLAND, A CORPORATION.

APPARATUS FOR ADMINISTERING ANESTHETICS.

SPECIFICATION forming part of Letters Patent No. 759,369, dated May 10, 1904.

Application filed December 29, 1903. Serial No. 187,009. (No model.)

*To all whom it may concern:*

Be it known that I, AUGUSTUS GEORGE VERNON HARCOURT, F. R. S., a subject of His Majesty the King of Great Britain, residing at Ryde, Isle of Wight, England, have invented a certain new and useful Improvement in Apparatus for Administering Anesthetics, of which the following is a specification.

This invention relates to improved apparatus for administering anesthetics, and is particularly well adapted for limiting and regulating the amount of chloroform administered in any particular case and for preventing the expired air passing back through the apparatus. It is, moreover, capable of being used with equal effect in whatever position the patient is placed.

The accompanying drawings illustrate an effective form of carrying out the invention.

Figure 1 is a part-sectional front elevation of my apparatus; Fig. 2, a side elevation thereof, also partly in section; and Fig. 3, a section through the distributing-valve chamber and valve, taken on the line $a\ b$ of Fig. 2 and viewed in the direction of the arrow thereon.

In said drawings the apparatus is shown as consisting of a tubular main stem 1, to which is connected, by means of an adjustable universal joint 2, a removable face-piece 3, the position of which in relation to the stem 1 may be varied and fixed at pleasure. The said face-piece has mounted thereon, or in close proximity thereto, a one-way outlet or expiratory-valve 4, through which the expired air is expelled.

At the top of the main stem is a chamber 5, into which open two side pipes 6 7, which carry at their outer extremities valve-chambers 8 9, respectively containing one-way inlet-valves 10 11. The said valve-chambers 8 9 are preferably formed with glass sides through which observation may be kept upon the valve actions within. One valve, 10, opens to the atmosphere to admit air to the side pipe 6, while the other valve, 11, is connected, preferably by a piece of flexible tubing 12, to the vessel containing the chloroform or other anesthetic. Such vessel is preferably in the form of a two-necked bottle 13, as shown, one neck, 14, of which is connected by the flexible tubing 12 to the valve-chamber 9, while the other neck, $14^{a}$, is open to the atmosphere, so that air may be drawn in over the surface of the anesthetic and mix therewith as the latter evaporates.

Within the chamber 5 is located a rotary distributing-valve 15 of cylindrical form, provided with suitable openings 16, 17, and 18, forming ports and arranged as shown in Fig. 3. The said valve is adapted to close either of the side pipes 6 7 entirely or partially, the arrangement being such that either one or other of the pipes is fully open to the main stem 1, or both are partially open thereto, so that the area of through-way is constant. The valve 15 is operated by an index-finger 19, on which a knob or the like may be provided as a handle. The index-finger is attached, by means of screws 20 or the like, to a plate 21, which is fixed to the cylindrical valve 15 and serves to close the front of the chamber 5, containing said valve, and turns therewith on the spindle 22, passing through the center of said valve, the position of the valve being indicated on a scale 23, as shown. A deflecting-plate 24 may also be provided within the valve-chamber, whereby any inrush from one side tube may be prevented from affecting a lesser inrush from the other.

It will be readily understood that in place of the cylindrical valve above described any ordinary slide-valve may be used or valve performing similar functions.

The lower portion of the bottle or vessel 13 is preferably made slightly conical, as shown, so that as the distance between the air-inlet and the surface of the liquid increases the area of the latter also increases.

The universal joint 2 between the face-piece 3 and the main stem 1 may after adjustment of said face-piece to the desired position be rigidly kept in that position by tightening a wing-nut 25 on a screwed spindle 26, which passes through the said joint and is provided on the outside thereof with a collar or shoulder 27, which abuts against the end of one part of said joint, the tightening of the said nut drawing the two parts of the joint together.

For practical use it is judged that the bottle or vessel and the temperature at which the liquid is maintained should be so proportioned and regulated that the amount of anesthetic taken up by the air as it is drawn over the liquid may be limited to the required amount, and as a maximum a mixture of two per cent. of chloroform (where the latter is the anesthetic used) and ninety-eight per cent. of air can be inhaled therefrom. The percentage of the anesthetic, however, may be increased to about 2.5 or three per cent. if a tube 30 with decreasing area at one end is inserted in the open neck $14^a$ of the bottle, as shown by dotted lines. The tube shown has two ends of differing diameters, and the greater increase occurs when the narrower end is downward in the neck of the bottle.

Two specific-gravity beads 28 29, preferably differently colored, denoting different specific gravities, may be provided, as shown, in the bottle 13, whereby the approximate temperature of the anesthetic in which they are suspended may be known and changes therein observed by the position of the beads.

The operation of the apparatus as used with chloroform is as follows: The vessel 13 is filled with chloroform to near the top of the conical part, and the face-piece 3 is adjusted in position over the patient's mouth and nostrils in the usual manner, or, if preferred, the apparatus may be fixed in an upright position and a flexible tube be interposed between the face-piece and the stem. If the temperature of the liquid is below 13° centigrade, both the colored beads will float on the surface; if above 15° centigrade, both will sink and the amount of chloroform inhaled will differ from the indication given by the pointer on the scale, in the first instance being less and in the second more than as indicated. The temperature, which is lowered by the evaporation, may be kept between 13° and 15° centigrade by holding the bottle 13 in the hand now and then. The position of the pointer 19 indicates the strength of the mixture which is being inhaled. When the pointer is, say, to the extreme left or farthest away from the chloroform, air only is being inhaled, when to the extreme right the maximum amount of chloroform—namely, about two per cent.—is inhaled, and when midway the two-per-cent. mixture will be diluted with an equal volume of air, the proportion then being about one per cent.

The valves 10 11 serve a secondary purpose—that is, besides preventing the passage of expired air they indicate whether the distributing-valve 15 is working properly, since when air alone is being admitted only the valve 10 on that side rises, and when the pointer is over to the other extremity of its arc and the chloroform mixture alone is being inhaled only the valve 11 on that side rises. When the pointer indicates a midway position of the distributing-valve 15 and equal volumes of air and mixture are being admitted, both valves 10 11 should open equally and synchronously. In other positions of the pointer the degree of opening should be greater or less in either valve, according to the pointer's position. When the eyes of the operator are engaged, information as to the frequency and strength of the patient's breathing are given by the click of the valve or valves as it or they fall back into the closed position at the termination of each inhalation by the patient.

In cases where the patient's breathing cannot be used as the motive power a blower for supplying the regulated mixture may be connected with this apparatus.

What I claim is—

1. In apparatus for administering anesthetics the combination of a main tubular stem, a face-piece connected thereto, branch pipes communicating with said main stem, valves in said branch pipes, a vessel for containing an anesthetic connected with one of said pipes, and a distributing-valve, located between the branch pipes and their respective valves, for regulating the supply of the anesthetic.

2. In apparatus for administering anesthetics the combination of a main tubular stem, a face-piece connected thereto, means for adjusting said face-piece, branch pipes communicating with said main stem, an inlet-valve carried by each branch pipe, a vessel for containing an anesthetic connected to one branch pipe and its valve, and a distributing-valve located between said inlet-valves to regulate the supply of the anesthetic.

3. In apparatus for administering anesthetics the combination of a main tubular stem, a face-piece connected thereto, means for adjusting said face-piece, a chamber carried by said main tubular stem, branch pipes opening into said chamber, inlet-valves carried by said branch pipes, a vessel for containing an anesthetic connected to one branch pipe and its valve, a distributing-valve located in said chamber on the main stem to regulate the supply of the anesthetic, and means for indicating the position of said distributing-valve.

4. In apparatus for administering anesthetics the combination of a main tubular stem, a face-piece adjustably connected thereto, an expiratory-valve in connection with said face-piece, a universal joint for adjustably connecting said face-piece to said main stem, means for locking said joint in position, a chamber carried by said main stem, branch pipes opening into said chamber, inlet-valves carried by said branch pipes, a vessel for containing an anesthetic connected to one branch pipe and its valve, a distributing-valve located in said chamber on the main stem, an index-finger acting as a handle to regulate the movement of said distributing-valve, and a scale indicating the position of such valve.

5. In apparatus for administering anesthetics the combination of a main tubular stem, a face-piece adjustably connected thereto, an expiratory-valve therein, branch pipes opening into said main stem inlet-valves carried by said branch pipes, a two-necked vessel for containing an anesthetic having one neck open to the air and the other attached to one of said branch pipes and its inlet-valve, and a distributing-valve carried by the main stem to regulate the amount of the anesthetic administered.

In testimony whereof I have hereunto set my hand in the presence of two subscribing witnesses.

AUGUSTUS GEORGE VERNON HARCOURT.

Witnesses:
ALLEN PARRY JONES,
ARTHUR HENRY ALFORD.